United States Patent [19]

Levine et al.

[11] 4,185,850

[45] Jan. 29, 1980

[54] AUTOMATIC RELEASE BICYCLE HOLDER

[76] Inventors: Edward H. Levine, 76 Locust St., Providence, R.I. 02906; F. E. Dixon Newbold, 9 Tilley Ave., Newport, R.I. 02840

[21] Appl. No.: 961,295

[22] Filed: Nov. 16, 1978

[51] Int. Cl.² .............................................. B62H 3/04
[52] U.S. Cl. .................................... 280/296; 70/228
[58] Field of Search ............... 280/296, 297, 293, 295, 280/271, 289 R, 289 L; 70/226, 227, 228

[56] References Cited

U.S. PATENT DOCUMENTS

| 470,836 | 3/1892 | Hall | 70/228 |
|---|---|---|---|
| 536,835 | 4/1895 | Kruschke | 280/296 |
| 537,265 | 4/1895 | Bell | 280/296 |
| 554,454 | 2/1896 | McKanna | 280/296 |
| 563,396 | 7/1896 | Morgher | 70/228 |
| 572,798 | 12/1896 | Hellwig | 70/228 |
| 666,358 | 1/1901 | Samuelson | 280/296 |
| 1,055,581 | 3/1913 | Webb | 280/296 |
| 1,291,076 | 1/1919 | Moffler | 70/22 T |

Primary Examiner—Joseph F. Peters, Jr.
Assistant Examiner—Donn McGiehan
Attorney, Agent, or Firm—Max Schwartz

[57] ABSTRACT

The device comprises a base block of material mounted on the frame bar of a bicycle which extends downwardly and rearwardly from the front fork. The block is mounted beneath the bar at the point closest to the adjacent front wheel and tire. The block is provided with rectangular cut out portions at the bottom front end corners. The cut out portions are provided with aligned pivot openings extending laterally from each side. A heavy spring wire frame is provided with spaced parallel arms having inwardy extending bent ends adapted to enter the aligned openings to pivotally mount the frame on the block. The outer end of the frame comprises an integral arcuate loop which is bent at almost right angles to the spaced arms. Beneath each pivot opening, the block is provided with an elongated raised rib which is adapted to hold the frame arms in a horizontal position with relation to the block. In use, the frame is pulled down towards the tire, the arms resiliently riding over the ribs, until the bent loop engages the tire and swings slightly rearwardly to firmly engage the tire and wheel on the top and on each side of the tire. This effectively locks the wheel against rotation and against turning out of the plane of the bicycle frame. The bicycle can easily be parked by leaning against a wall and it will not slip or fall. When the rider takes the bicycle and moves it forwardly, the tire will force the wire frame forwardly and kick it out of the way into the initial position with the arms over the ribs. The ribs serve to keep the wire frame arms in this position. Provision can be made for preventing the pullout of the frame arms from the pivot openings.

10 Claims, 6 Drawing Figures

AUTOMATIC RELEASE BICYCLE HOLDER

BACKGROUND OF THE INVENTION

In parking a bicycle, many devices have been used for immobilizing the bicycle including a conventional kick stand. Many bicycles have no stands and the bicycle will easily be knocked over when it has a kick stand. Most riders like to lean the bicycle against a wall when entering a store or structure. But the turn of the front wheel will cause the bicycle to fall. Other types of devices have been invented for locking the front wheel against rotation. For example, U.S. Pat. Nos. 1,055,581; 563,396; 470,836; 572,798 and 1,291,076. These are variations of a lock mechanism for locking the wheel in place. U.S. Pat. No. 554,454 shows a device which holds the wheel against rotation and against pivotal turning. However, all of these devices require a positive manual release or the bicycle cannot be used. Failure to release the lock will result in damage to the bicycle.

SUMMARY OF THE INVENTION

The present invention provides a device which holds the front wheel against rotation or pivotal movement so that the bicycle can be propped against a wall without falling. The device of the present invention will automatically release if the bicycle is moved forwardly and no manual release is required. A rectangular block of metal or other suitable material is mounted beneath the bicycle frame on the bar which extends downwardly and rearwardly from the front fork. The mounting can be permanent or clamped. The bottom front corners of the block are cut out and the side walls of the cut out are provided with aligned openings. A heavy spring wire frame is provided with spaced parallel arms having inturned free ends adapted to enter the aligned openings to pivotally mount the frame on the block. The frame arms are joined at the outer free end by an integral loop bent at right angles to the frame. Beneath each pivot opening, the block is provided with a raised elongated rib which engages the arms and tends to hold the frame parallel to the bicycle bar. In use, the wire frame is pushed down, the arms springing slightly out to ride over the ribs, until the loop engages the tire of the front wheel and acts as a clamp on it to hold it against rotation and against pivotal movement. When the rider is ready to go, a forward push or movement of the bicycle will cause the front wheel to automatically kick the wire frame out of the way and back toward the starting position. The ribs will tend to force the wire arms back to parallel position without further manual action.

DESCRIPTION OF THE INVENTION

The device of the present invention is mounted on the bicycle frame bar extending downwardly and rearwardly from the front fork, at a point close to the front wheel. The frame bar 10 extends from the fork 12 in which the front wheel 14 is mounted for steering.

Figure 1:
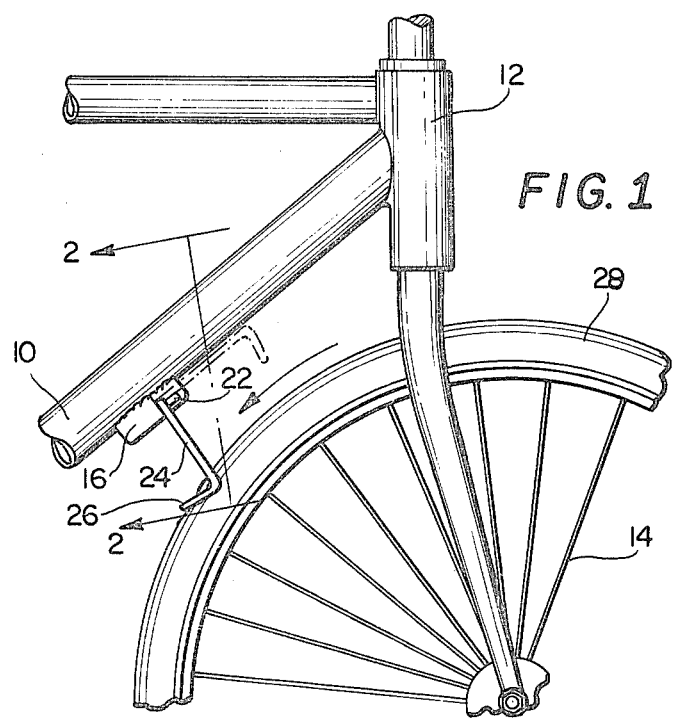
FIG. 1 is a fragmentary side elevation of a bicycle front wheel and frame with the device of the present invention in locking position.
Figure 2:
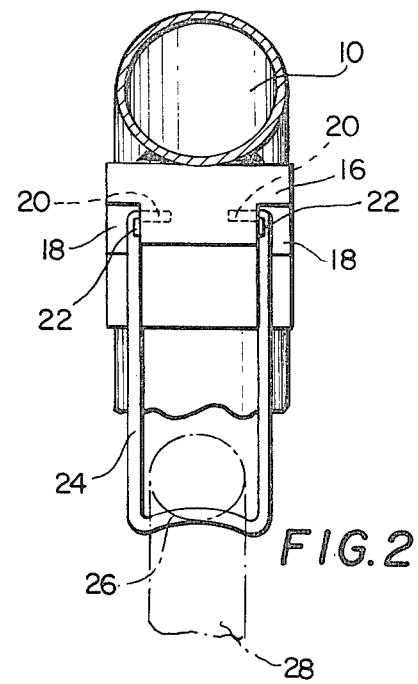
FIG. 2 is an enlarged section taken on line 2—2 on FIG. 1.
Figure 3:
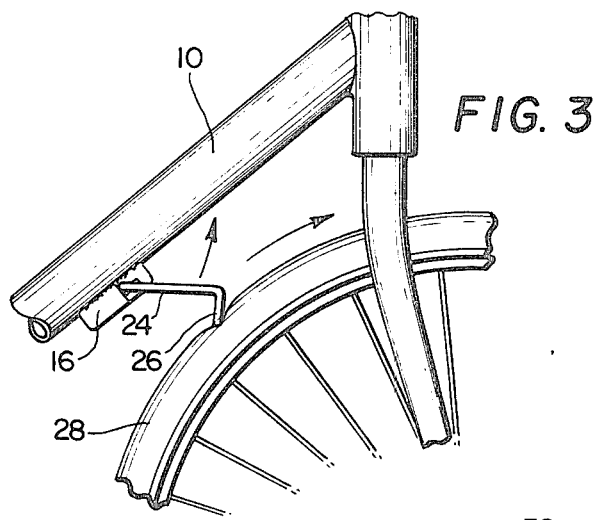
FIG. 3 is a view similar to FIG. 1 with the device in partially open position.

A rectangular block of metal 16 is welded or otherwise attached to the bottom surface of the bar 10, FIGS. 1 and 3. At its forward end, the block 16 is provided with rectangular cut out sections 18 at the lower forward corners. The side walls of each cut out section 18, adjacent the rear thereof, are provided with pivot openings, dotted lines 20 in FIG. 2, extending toward each other in axial alignment. Beneath each opening 20 and slightly spaced therefrom, a raised rib of metal 22 extends parallel to the horizontal edge of the block 16.

We now provide a spring wire frame member 24 having a loop portion 26 at the front end bent at right angles to the body of the member 24 and curved to nest over the front tire 28, FIG. 2. At the rear, the spaced parallel arms of the member 24 are provided with inwardly bent ends 30 adapted to pivotally fit into the openings 20. The spacing of the arms 24 is such that it is slightly less than the width of the block 16 at the openings 20 so that the member 24 will be held in the openings by the resiliency of the wire.

When the member 24 is positioned parallel to the bar 10, dotted lines FIG. 1, the wire lies just over the raised ribs 22 which serve to retain the frame in this position. When the bicycle is to be propped against a wall, the frame 24 is manually pushed down so that the arms override the ribs, flexing slightly out of the pivot openings 20. The loop portion 26 engages the tire 28 and the wheel is turned slightly rearwardly, arrow in FIG. 1, to force the loop around the tire. The front wheel is now immobilized and will not rotate or turn, allowing the bicycle to be propped against a vertical wall without falling.

When the rider is ready to proceed, he merely moves the bicycle forwardly, FIG. 3, and the wheel and tire 28 will automatically kick the wire frame 24 forwardly and up away from the wheel. The pressure of the resilient arms of the frame 24 on the ribs 22 will help the upward movement and serve to urge the arms back into the dotted line position in FIG. 1. Pivotal movement of the frame 24 is limited to the retangular cut-out section 18 as shown in FIGS. 1 and 2. Note that no manual action is necessary to release the device and it will automatically let go even if the rider forgets that it is on.

Figure 4:
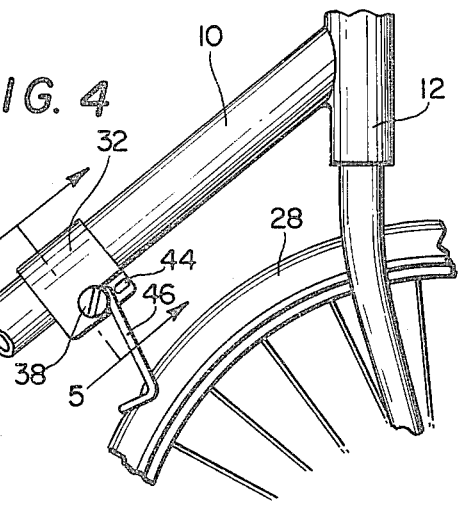
FIG. 4 is a view similar to FIG. 1 showing a modified form of mounting the device.
Figure 6:
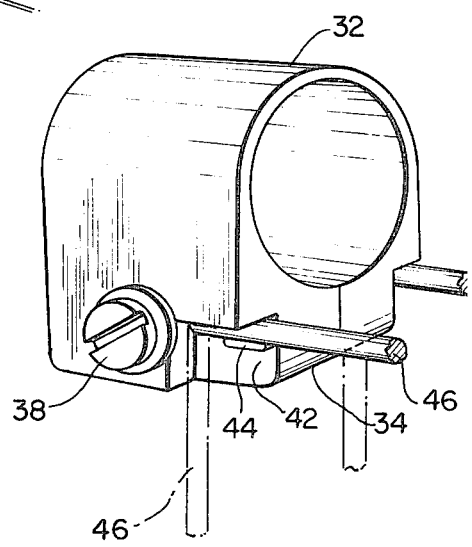
FIG. 6 is an enlarged perspective view of the modified form of mounting.
Figure 5:
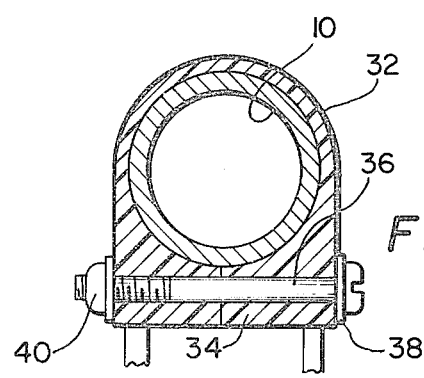
FIG. 5 is an enlarged section taken on line 5—5 on FIG. 4.

In FIGS. 1 to 3, inclusive, the device has been shown as original permanent equipment on a bicycle. FIGS. 4 to 6 show the device as a separate member which can be mounted on any bicycle. In this form, the device is in the form of a clamp 32 having a heavy lower rectangular portion 34. In mounting the device on the bar 10, the clamp is tightened by a transverse nut and bolt arrangement 38 and 40. Both the head of the bolt 38 and the nut 40 are provided with integral washer portions which overlap the cut outs 42.

As in the previous form, the cut outs 42 are provided with ribs 44 which serve to retain the spring wire arms 46 in horizontal position, the walls of the cut-outs 42 limiting the pivotal movement of the spring wires arms 46. However, note that the washer nut and bolt overlap extends over the pivot points of the arms 46 so that when the arms are swung into the operating position, dotted lines FIG. 6, they can ride over the ribs and flex slightly out of the pivot openings but cannot come out completely as the washers will serve to lock them in place. If desired, similar overlapping washers can be added to the form shown in FIG. 1 to prevent the arms from completely pulling out of the pivot openings.

As can be seen in FIG. 4, the operation of the clamp type mounting is the same as the permanent type shown in FIG. 1. In both cases the device is put on manually but will release automatically on forward movement of the front wheel. Thus the bicycle cannot be damaged by forgetfulness and failure to release the lock.

The device is simple in construction and easy and economical to manufacture and assemble. It is easy to install and has a minimum number of movable parts. Other advantages of the present invention will be readily apparent to a person skilled in the art.

We claim:

1. An automatic release bicycle holder comprising a rectangular block of material forming a base, means for mounting said block beneath the bicycle frame bar which extends downwardly and rearwardly from the front fork at a point adjacent the front wheel and tire, the lower forward corners of said block being cut out to form rectangular cut out portions on each side, a pivot opening on each side extending inwardly in said cut out portions in axial alignment, and a spring wire frame pivotally mounted in said openings, said cut-out portions limiting the pivotal movement of said spring wire frame, said frame engaging the front wheel tire to hold the front wheel against rotation or turning when said frame is pivoted downwardly against the front tire.

2. A device as in claim 1, wherein said frame automatically releases the front tire and wheel when the front wheel is rotated forwardly.

3. A device as in claim 1, wherein said block is provided with raised ribs extending horizontally beneath said pivot openings to resiliently retain said frame in position away from the front tire.

4. A device as in claim 1, wherein said frame comprises spaced parallel arms having inwardly bent ends adapted to enter said pivot openings, said arms being integrally joined by an arcuate loop bent at right angles to the arms adapted to engage the front wheel tire.

5. A device as in claim 3, wherein said frame automatically releases the front tire and wheel when the front wheel is rotated forwardly.

6. A device as in claim 5, wherein said frame comprises spaced parallel arms having inwardly bent ends adapted to enter said pivot openings, said arms being integrally joined by an arcuate loop bent at right angles to the arms adapted to engage the front wheel tire.

7. A device as in claim 1, wherein means are provided for preventing said frame from accidentally pulling out of said pivot openings when said frame is pivoted downwardly into operative position.

8. A device as in claim 7, wherein said means includes a nut and bolt extending transversely through said block, the heads of said nut and bolt having a washer extending over said pivot openings to prevent the removal of said frame.

9. A device as in claim 1, wherein said block mounting means comprises a clamp extending around the bicycle bar, the lower portion of said clamp forming the base block.

10. A device as in claim 8, wherein said block mounting means comprises a clamp extending around the bicycle bar, the lower portion of said clamp forming the base block, said nut and bolt holding said clamp on said bar.

* * * * *